United States Patent [19]

Symmons

[11] Patent Number: 4,917,137

[45] Date of Patent: Apr. 17, 1990

[54] PRESSURE-BALANCING MIXING VALVE

[75] Inventor: Paul C. Symmons, Wellesley, Mass.

[73] Assignee: Symmons Industries, Inc., Braintree, Mass.

[21] Appl. No.: 241,912

[22] Filed: Sep. 7, 1988

[51] Int. Cl.⁴ .......................................... F16K 11/04
[52] U.S. Cl. ...................................... 137/98; 137/111; 137/625.4; 251/267
[58] Field of Search .............. 137/111, 98, 100, 625.4; 251/266, 267

[56] References Cited

U.S. PATENT DOCUMENTS

| | | | |
|---|---|---|---|
| 703,963 | 7/1902 | Lynch | 251/266 X |
| 1,281,759 | 10/1908 | Brabson | 251/266 |
| 3,092,129 | 6/1963 | Steen | 137/625.4 X |
| 3,099,996 | 8/1963 | Symmons | 137/98 |
| 3,448,755 | 6/1969 | Symmons | 137/100 |
| 3,770,017 | 11/1973 | Enterante | 137/625.4 |

Primary Examiner—Alan Cohan
Attorney, Agent, or Firm—Schiller, Pandiscio & Kusmer

[57] ABSTRACT

A mixing valve for two fluids under pressure at different temperatures. The mixing valve has a body with means defining a valve chamber, separate inlet ports for each of the fluids to be mixed, and an outlet port. A main mixing valve unit projects into the valve chamber. The mixing valve also has a means for causing axial movement of the main mixing valve unit within the main valve chamber while preventing rotation of the main valve unit relative to the valve chamber.

6 Claims, 3 Drawing Sheets

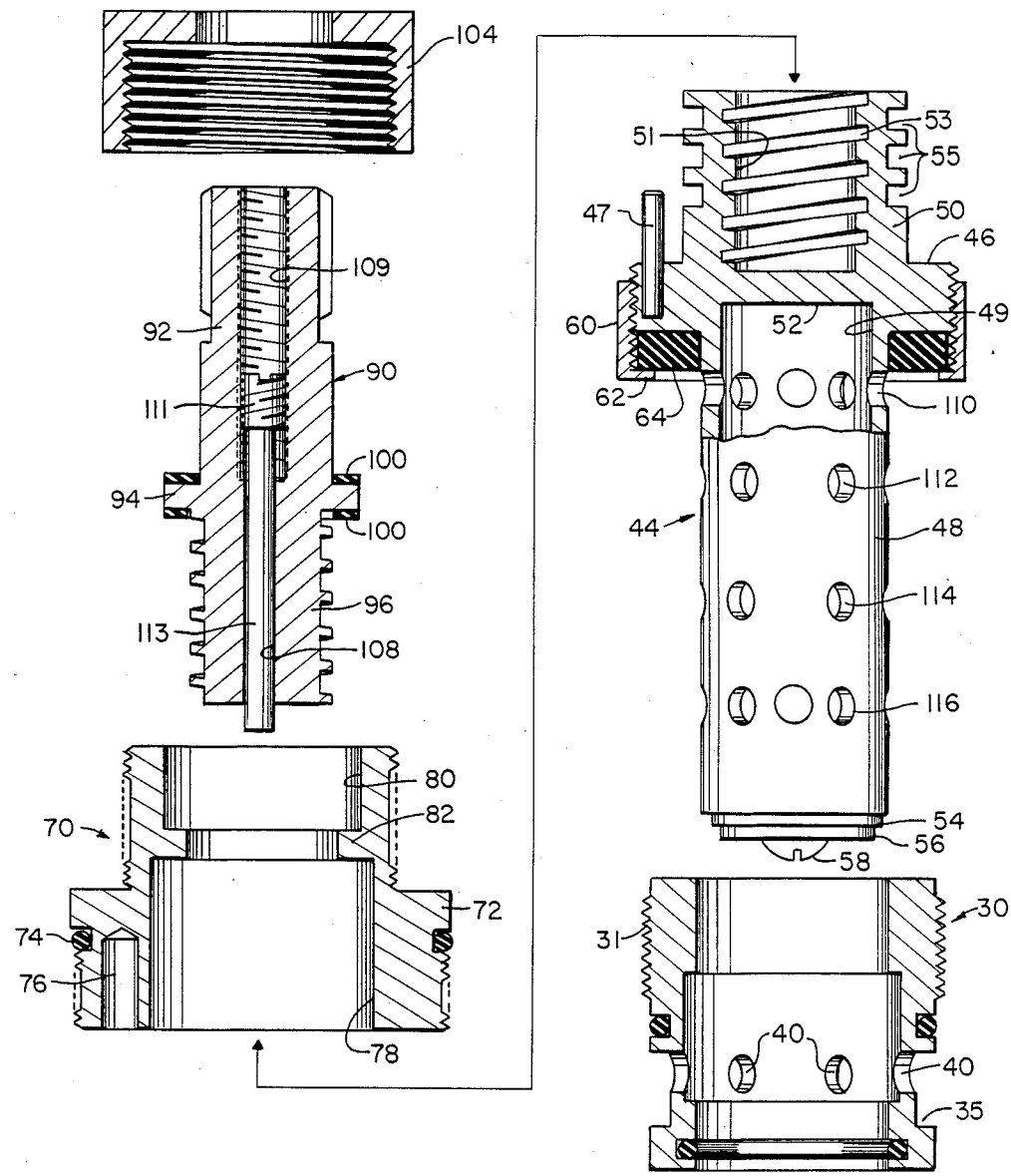
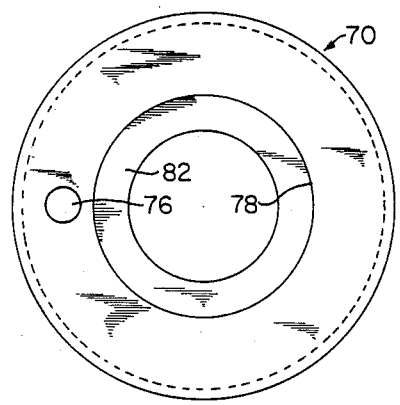
Fig. 3
Fig. 4

PRESSURE-BALANCING MIXING VALVE

FIELD OF THE INVENTION

This invention relates to pressure-balancing valves. More particularly, it relates to mixing valves for showers and bath installations.

BACKGROUND OF THE INVENTION

Mixing valves using water pressure-equalizing valves as provided in U.S. Pats. No. 2,308,127, 3,099,996 and 3,448,755 have achieved extensive commercial success because they have effectively eliminated the danger of accidental scalding resulting from a rapid change in water temperature as a consequence of a variation in water pressure.

Unfortunately, the piston-containing cylinder members in such valves described therein have been found to wear out after a few years in high use installations such as in dormitory showers. This wear is not sufficient to negate the usefulness of the inventions disclosed in the above-referenced patents. However, it has created a need for an improved device that wears better in high usage installations.

OBJECTS OF THE INVENTION

Accordingly, the primary object of the invention is to provide an improved long-wearing pressure-balancing mixing valve that will continue to provide water at a selected temperature in high use installations over an extended period of time.

A further object to this invention is to provide an improved long-life pressure-balancing mixing valve that is relatively easy to manufacture with high precision tolerances and is easy to assemble.

SUMMARY OF THE INVENTION

The present invention is an improved valve for mixing two fluids under pressure at different temperatures comprising: (1) a valve body having separate inlet ports for each fluid and an outlet port for mixed fluids, (2) means in the valve body defining a valve member chamber, (3) a movable valve member projecting into the valve member chamber, the valve member having a tubular section with separate inlet and outlet openings for each fluid and containing a means for varying the rate of flow of said fluids through said openings in accordance with changes in fluid pressure, and (4) a means for causing axial movement of the tubular section within the valve member chamber without causing rotation of the valve member relative to the valve chamber, the axial movement causing the selected ports of the valve member to open or close according to the direction of axial movement of said valve member.

BRIEF DESCRIPTION OF THE DRAWINGS

These and other objects and features of the present invention are more fully disclosed or rendered obvious by the following detailed description of the preferred embodiment of the invention, which is to be considered together with the accompanying drawings wherein like numbers refer to like parts, and further wherein:

FIG. 3 is an exploded sectional view of portions of the pressure-balancing mixing valve embodying the present invention; and FIG. 4 is a bottom view of the bushing shown in FIG. 3.

DETAILED DESCRIPTION OF THE DRAWINGS

Figure 1:
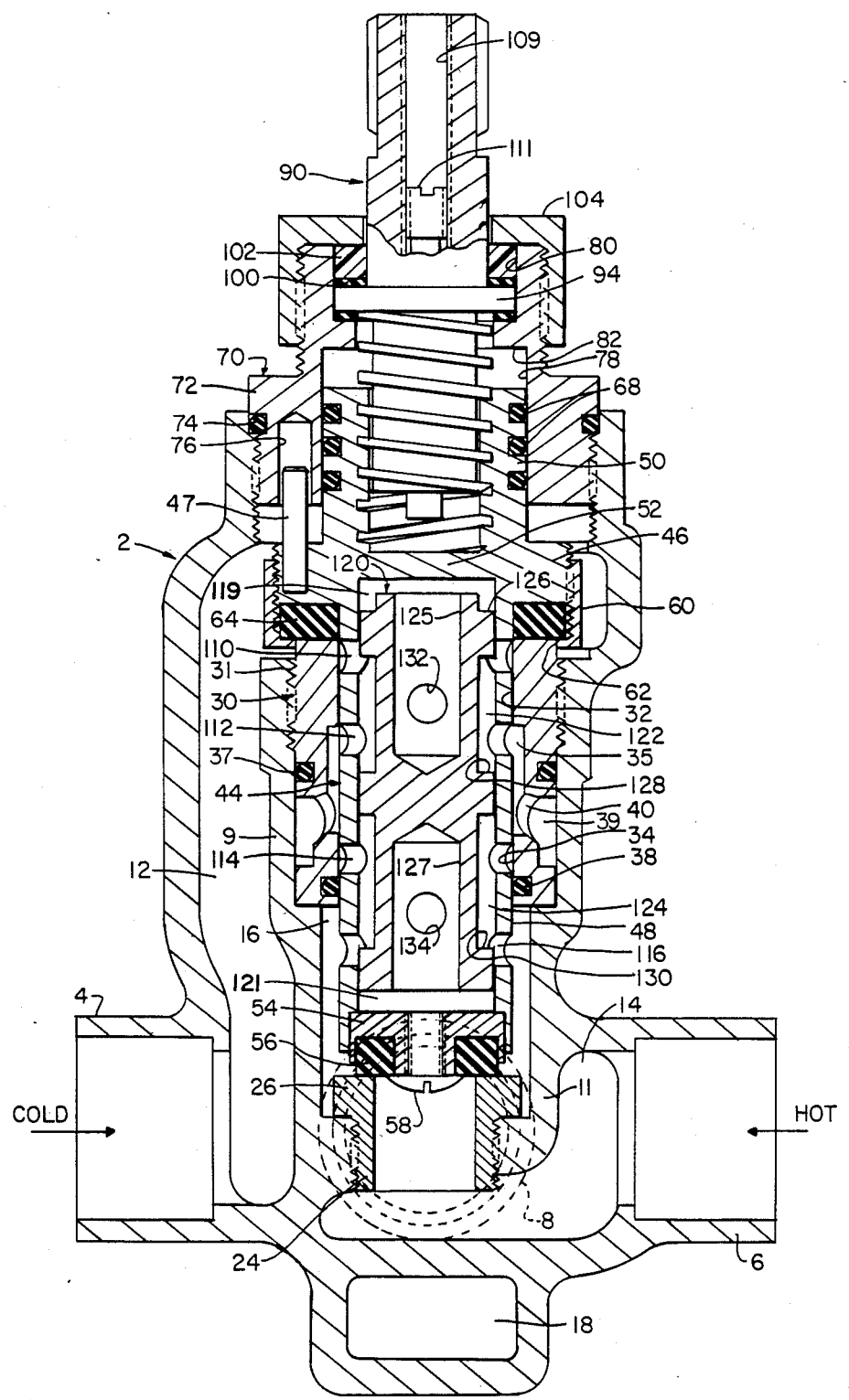
FIG. 1 is an axial sectional view of a pressure-balancing mixing valve embodying the present invention.
Figure 2:
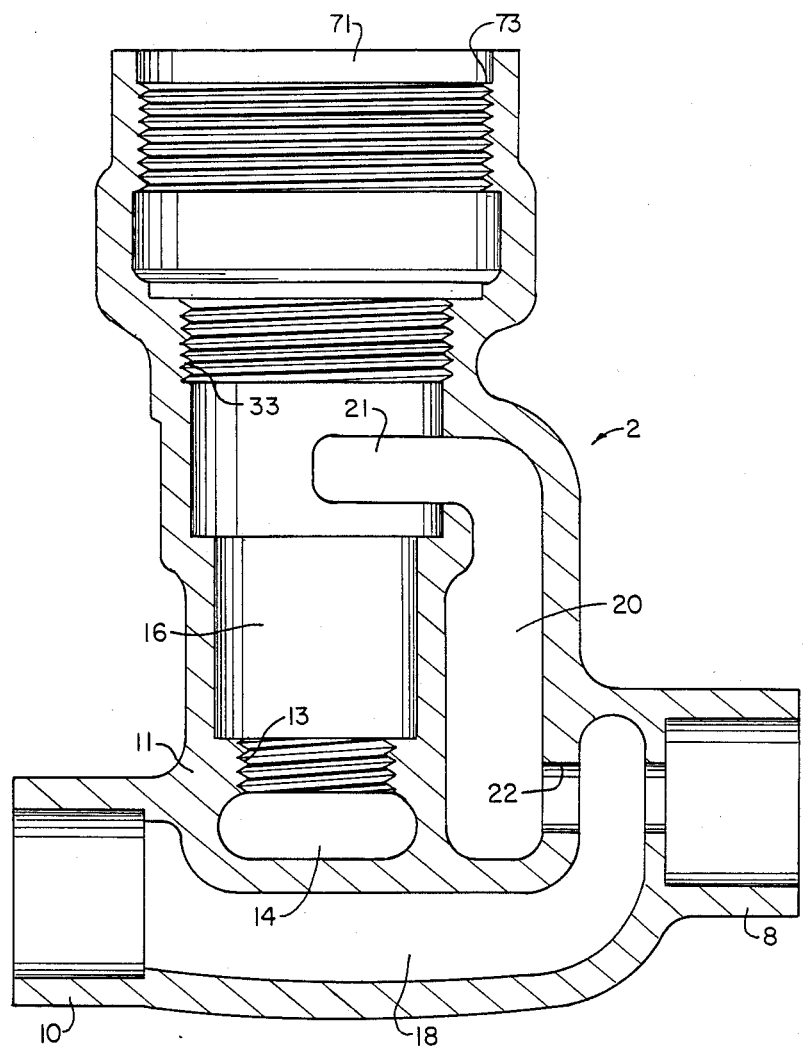
FIG. 2 is a view of the valve body of the pressure-balancing mixing valve of FIG. 1 rotated 90 degrees, with the movable valve member removed.

The preferred embodiment of the invention, illustrated in FIGS. 1-3, comprises a valve body 2 in the form of a core casting having oppositely disposed bosses 4 and 6 that are adapted to be connected to water supply pipes and function as inlet ports for cold and hot water respectively. Valve body 2 also comprises a third boss 8 and a fourth boss 10 extending at right angles to bosses 4 and 6. Bosses 8 and 10 are adapted to be connected respectively to a suitable delivery pipe leading to a tub spout and a shower head. Bosses 4, 6, 8 and 10 may be internally threaded to facilitate connection to hot and cold water supplies and discharge lines.

The valve body has internal partitions, some of which are shown at 9 and 11 that subdivide its interior into two inlet passageways 12 and 14 connecting with inlet ports 4 and 6 respectively, a valve chamber 16, an outlet passageway 18 that communicates with outlet port 10, and an outlet passageway 20 that communicates with valve chamber 16 via an opening 21 and communicates with outlet port 8 and outlet passageway 18 by an opening 22. Inlet passageway 14 is connected to valve chamber 16 via an annular bushing 24 that is screwed into a threaded hole 13 in partition 11 separating valve chamber 16 and inlet passageway 14. Bushing 24 is provided with a flange 26 that functions as a seat for the bottom end of a main valve assembly that is generally identified by numeral 44 and is identified in greater detail hereafter.

The valve body supports internally a substantially cylindrical valve casing identified generally at 30 that extends into valve chamber 16. Valve casing 30 is threaded externally at 31 so as to permit valve casing 30 to be screwed into internal threads 33 of the valve body. The valve casing and valve body coact to define a valve member chamber that includes valve chamber 16.

The internal diameter of valve casing 30 is reduced at two axially spaced locations so as to provide two cylindrical bearing surfaces 32 and 34 and an interior mixed water flow groove or chamber 35 between valve casing 30 and valve assembly 44. These bearing surfaces define top and bottom openings which are occupied by main valve assembly 44 hereinafter described. Valve casing 30 is open at its top and bottom ends and its flat annular upper end surface serves as an upper valve seat for the main valve assembly 44. The valve casing has external and internal grooves provided with O-rings 37 and 38 to provide water seals between (a) valve casing 30 and (b) valve body 2 and main valve assembly 44 respectively. Valve casing 30 also has an external groove that defines an annular mixed water outlet chamber 39 between the casing and valve body 2, plus a plurality of ports 40 that lead from mixed water chamber 35 into mixed water outlet chamber 39. Outlet chamber 39 is connected to outlet port 8 by opening 21 and interior outlet passageway 20 in valve body 2.

As seen best in FIG. 3, main valve assembly 44 comprises a valve head 46, a lower hollow valve cylinder 48 and an upper valve stem 50. The valve cylinder extends through valve casing 30 as shown. The interior surface 49 of valve cylinder 48 has a constant diameter except that at its bottom end it is enlarged to accept a plug 54 hereinafter described. Plug 54 is affixed to valve cylinder 48 and has a threaded hole for a screw 58 that holds a washer 56 tight in a groove in the plug. Washer 56 is sized to contact the upper end surface of bushing 24 when main valve assembly 44 is in its lowermost position as shown in FIG. 1, the bushing acting as a lower valve seat for valve assembly 44. The upper end of valve cylinder 48 terminates in an end wall 52 (FIG. 3) that forms part of valve head 46.

Valve head 46 is threaded at its periphery so as to accept a threaded collar 60 having a lip or flange 62 that engages and holds a washer 64 tight against the underside of the valve head. Washer 64 is provided for engagement with the flat upper end surface of valve casing 30 (see FIG. 1), with that surface acting as an upper valve seat for the main valve assembly.

The valve stem 50 of valve assembly 44 is hollow and its center bore 51 has a left hand screw thread 53. It also has three peripheral grooves 55 for receiving three O-rings 68 (FIG. 1) for making a sliding fluid seal with a bushing 70 hereinafter described.

Valve assembly 44 also has a hole in the upper side of valve head 46, and a drive pin 47 is anchored in that hole and projects from the valve head along a line that is spaced from but parallel to the axis of valve assembly 44.

The upper end of valve body 2 has a suitable aperture which is threaded as shown at 71 to receive a threaded cylindrical bushing 70 (FIG. 1). The latter has a flange 72 and a groove to accommodate an O-ring 74. Bushing 70 is screwed into the valve body so as to cause O-ring 74 to be squeezed against a shoulder 73 on the inside of the valve body, whereby to prevent leakage of fluid from between the bushing and valve body 2. Flange 72 is preferably designed with a polygonally shaped perimeter to permit gripping and rotation thereof by a wrench. Flange 72 also has a blind hole 76 (FIG. 1) that is located and sized so as to make a sliding fit with the projecting portion of pin 47.

As shown in FIGS. 3 and 4, bushing 70 has a relatively large central bore 78 and a smaller upper central bore 80 separated by an annular shoulder 82. The lower central bore 80 is sized to make a close fit with the valve stem 50 of valve assembly 44 and its length is made so that the flat upper surface of the valve stem can sit flush against the lowermost surface of shoulder 82 when the main valve assembly is fully raised off of its valve seats. Pin 47 is long enough to remain in blind hole 76 when the valve assembly is engaged with valve seats 26 and 30. Pin 47 prevents rotation of valve assembly 44 relative to bushing 70 and valve casing 30 when the valve assembly is caused to move axially from its closed position to its open position, or vice versa.

A spindle 90 is provided (FIGS. 1 and 3). It comprises an upper handle section 92, a flange 94 and a threaded drive section 96. The flange 94 is sized to make a close fit in the upper smaller bore 80 of bushing 70, while the threaded drive section 96 is engaged to screw into the threaded bore 51 of valve stem 50. Two relatively hard plastic washers 100 are mounted on spindle 90 on opposite sides of flange 94, and a softer rubber washer 102 (shown in FIG. 1) is engaged with the upper washer 100. A threaded collar 104 has a center hole which is large enough to rotatably accommodate the handle section 92 of spindle 90 and is screwed onto the upper end of bushing 70. Collar 104 compresses washers 100, 102 and flange 94 toward shoulder 82 of bushing 70, thereby preventing the spindle from moving axially when it is rotated relative to bushing 70. The handle section 92 of spindle 90 is adapted to fit and be locked to a suitable handle (not shown) that is shaped so as to permit a person to grip it and force it to rotate the spindle as desired to control hot and cold water flow through the valve.

Spindle 90 has a central bore 108 extending throughout its length, and one portion of that bore is threaded as at 109 so as to receive the enlarged threaded head 111 of a limit pin 113. Pin 113 is designed to project from the threaded drive section 96 of spindle 90 so that it can intercept the wall 52 of valve stem 50. The amount that pin 113 projects from the threaded drive section of spindle 90 controls the depth to which the spindle can be screwed into valve stem 50 of main valve assembly 44. Pin 113 may extend from spindle 90 far enough to prevent the top end surface of valve stem 50 from engaging flange 82.

By virtue of the above-described construction, when main valve assembly 44, bushing 70, spindle 90 and collar 104 are assembled relative to valve body 2 as shown in FIG. 1, rotative movement of spindle 90 relative to the valve body will cause it to screw in and out of central bore 51 of valve stem 50, thereby causing corresponding longitudinal movement of main valve assembly 44 relative to valve casing 30. As the main valve assembly 44 moves longitudinally relative to the main valve assembly, interaction of pin 47 and blind hole 76 will prevent relative rotation of the valve assembly 44. Longitudinal (i.e., axial) movement of main valve assembly 44 will vary the spacing between valve washers 56 and 64 and their valve seats 26 and 30 respectively, whereby to vary the flow of hot and cold water into the valve.

At this point it is to be noted that hollow valve cylinder 48 is provided with four sets of holes 110, 112, 114 and 116 (FIGS. 1 and 3) arranged in descending order. Each set of holes consists of at least two diametrically opposed holes, but a larger number of holes may be provided in each set. The essential thing is that the holes in each set are located in a common plane extending transversely of the cylinder 48. The arrangement of holes 110, 112, 114 and 116 is such that if main valve assembly 44 is in its lowermost position with its washers 56 and 64 engaging their valve seats 26 and 30, holes 11 will be blocked by bearing surface 32, holes 112 will be in communication with chamber 35, holes 114 will be blocked by bearing surface 34, and holes 116 will be below bearing surface 34 in communication with valve chamber 16. Hence no hot or cold water can flow through the valve.

The screw threads 53 and the mating screw thread on drive section 96 of spindle 90 are preferably arranged so that if the spindle is rotated counter clockwise ¼ of a revolution, washers 56 and 64 will move off of their valve seats 26 and 30, and pin 47 will move further into hole 76 while preventing rotation of valve assembly 44 relative to valve casing 30. However, with only a ¼ revolution turn of spindle 90, only cold water will be able to flow through the mixing valve. The cold water will flow in turn into the main valve assembly via boss 4, inlet passageway 12 and holes 110, out of the main valve assembly into the valve casing chamber 35 via holes 112, out of valve casing chamber 35 into chamber 39 via ports 40, and then into discharge outlet 8 via the interior outlet passageway 20 (shown in FIG. 2) in body 2. Hot water flow will be prevented because holes 114 will still be blocked by bearing surface 34.

If the spindle 90 is turned an additional ¼ revolution, both hot and cold water will flow through the valve. At this point, half of each of the holes 110 and 112 will be blocked by bearing surface 32, half of hole 114 will be blocked by bearing surface 34, and holes 116 will be fully open. The hot water will flow into the main valve cylinder via inlet passageway 14 and holes 116, and then out of main valve cylinder 48 into valve casing chamber 35 where its mixes with cold water. The mixture of hot and cold water then exits casing chamber 35 via ports 40, chamber 39 into interior passageway 20 and ultimately discharge through bosses 8 and 10.

If the spindle 90 is turned almost another ¼ revolution the holes 112 will be fully blocked by bearing surface 32 and holes 114 and 116 will be fully open. Accordingly, only hot water will flow through the valve. Various intermediate settings of spindle 90 will provide different size outlet areas, i.e., different exposures of holes 112 and 114 and thereby different mixtures of hot and cold water.

In accordance with prior practiced as exemplified by the above-identified patents, a pressure equalizing piston is provided to hold the mixed water temperature steady despite fluctuations in inlet water pressures. The pressure equalizing piston valve is in the form of a cylindrical member 120 (FIG. 1) sized to make a close sliding fit with the interior surface of cylinder 48 of main valve assembly 44.

Piston valve 120 is shorter in length than the interior of valve cylinder 48 and creates chambers 119 and 121 at its opposite ends when it is not positioned at either end of the valve cylinder in engagement with end wall 52 or plug 54. Chambers 119 and 121 are dynamic in nature in that their volume capacity changes as piston valve 120 slides within the interior of cylinder 48 due to relative pressure changes from the hot and cold water sources.

Piston valve 120 is provided with two circumferentially extending peripheral grooves that subdivide its exterior into three piston sections 126, 128 and 130 that make a close sliding fit with the interior surface of cylinder 48. The three piston sections coact with cylinder 48 to define two moving annular chambers 122 and 124. Additionally, the piston valve is formed with two blind axial bores 125 and 127 at its opposite ends. These bores are open to the annular chambers 122 and 124 by way of suitable holes 132 and 134. Preferably, there are four holes 132 and four holes 134 evenly spaced around piston valve 120.

When the valve is closed after having been used, water remaining in chambers 119 and 121 will tend to keep piston valve 120 spaced from end wall 52 and plug 54, with chambers 119 and 121 being approximately, but not necessarily, equal in volume as shown in FIG. 1.

The inlet ports 110 and 116 for cold and hot water respectively are closable in varying amounts by piston sections 126 and 130 of equalizing piston valve 120 according to fluctuations in water pressure. When the valve is operated so as to admit cold and hot water, cold water will pass into the annular chamber 122 via partially obstructed water inlets 110 and into chamber 119 via holes 132. Simultaneously, hot water will pass into annular chamber 124 via partially obstructed water inlets 116 and into chamber 121 via holes 134.

The size of chambers 119 and 121 located at opposite ends of the piston valve 120 will be influenced by the hot and cold water pressures. These opposing fluid pressures will cause piston valve 120 to move in one direction or the other in response to a pressure change in the cold or hot water supply lines. When the cold water pressure drops, hot water entering through holes 134 will cause the equalizing piston valve 120 to move upward away from plug 54 so as to enlarge chamber 121, close off the hot water inlets 116 and unblock more of cold water inlets 110. If there is a relative drop in hot water pressure, cold water entering through holes 132 will cause piston valve 120 to move downward away from end wall 52 so as to unblock more of the water inlet ports 116 and close off more of the cold water inlets 110. By virtue of such pressure-balancing action the delivery of scalding fluid is prevented and the opposing fluid pressures of the cold and hot water will automatically position the equalizing piston valve to maintain constant the temperature of mixed water delivered to the discharge chamber.

The above-identified valve construction offers the advantage that the valve assembly 44 moves only axially when spindle 90 is rotated to vary the mixed water temperature, and in practice that action may be limited to a total travel from fully open to fully closed of only about ⅛ inch. As a consequence, the wear on the cylinder of the valve assembly is minimized and the valve will function satisfactorily for years in a high-use installation.

Of course, the specific construction of the valve including valve body 2, valve casing 30 and equalizing piston valve 120 may be varied without departing from the above described arrangement (spindle 90, bushing 70 and pin 47) for operating the valve assembly so that it can move axially while being held against rotations. Thus, for example, the valve body may have the construction shown in FIGS. 1 and 2 of U.S. Pat. No. 3,448,755 to provide a combination of pressure-balancing mixing valve with a diverter valve that is built into the same valve body and provides a flow volume control at the outlet end of the valve.

Still other changes will be obvious to persons skilled in the art.

What is claimed is:
1. A mixing valve for two fluids under pressure at different temperatures comprising:
 a valve body having means defining a main valve chamber with separate inlet ports for each of said two fluids and an outlet port;
 a main valve assembly having first and second valve means for varying the flow of said fluids from said separate inlet ports to said main valve chamber, said main valve assembly comprising a tubular valve cylinder projecting into said main valve chamber; and
 rotatably operative means for causing reversible axial movement of said tubular section within said main valve chamber without axial rotation of said valve cylinder assembly relative to said valve body, said reversible axial movement causing said first and second valve means to move between a first closed position and a second open position;
 said rotatably operative means comprising a pin mounted to said main valve assembly and projecting therefrom in parallel relationship with the longitudinal axis of said main valve assembly, a spindle rotatably mounted outside of said main valve chamber, screw means connecting said spindle to said main valve assembly whereby rotation of said spindle will cause axial movement of said main valve assembly, and a stationary member having an aperture into which said pin slidably extends, said stationary member and said pin coacting to prevent rotation of said valve cylinder as said valve cylinder is moved axially by rotation of said spindle;

said main valve assembly having a threaded central bore, and said spindle having a threaded section that is screwed into said threaded central bore, whereby rotation of said spindle will cause said main valve assembly to move axially relative to said main valve chamber;

said spindle having a threaded axial bore; and further including a limit pin screwed into said axial bore, said limit pin having a length sufficient for it to project from said spindle far enough to intercept said main valve assembly and thereby limit the range of axial movement of said main valve assembly relative to said valve body.

2. A mixing valve for mixing first and second fluids under pressure at different temperatures, said mixing valve comprising:

a hollow valve body (2) having first and second inlets ports (4,6) for said first and second fluids respectively, at least one outlet port (8 or 10), means (9,11) subdividing the interior space of said valve body into (a) a main valve chamber (16) having first and second open ends, (b) a first inlet passageway (12) that communicates with said first inlet port and said first open end, (c) a second inlet passageway (14) that communicates with said second inlet port and said second open end, and (d) an outlet passageway (20) that communicates with said at least one outlet port;

a valve casing (3) that extends into said main valve chamber and is secured to said valve body, said valve casing and said valve body coacting to form a valve member chamber that includes said main valve chamber (16) and a mixed fluid outlet chamber (39) that communicates with said outlet passageway (20);

means defining first and second valve seats at said first and second open ends respectively of said main valve chamber;

a main valve assembly (44) comprising (a) a hollow valve cylinder (48) projecting into said valve casing, and (b) first and second valve means at opposite ends of said valve cylinder disposed so as to move into and out of seating relationship with said first and second valve seats respectively as said main valve assembly is moved axially in said valve casing, whereby to vary the flow of fluids from said first and second inlet ports into said main valve chamber via said first and second open ends respectively;

means defining a mixed water chamber (35) between said valve casing and said hollow valve cylinder and at least one opening (40) in said valve casing providing communication between said mixed water chamber (35) and said mixed water outlet chamber (39);

chamber-forming means (120) forming first and second annular chambers (122,124) within said hollow valve cylinder;

first and second openings (110,116) in said hollow valve cylinder for introducing fluid from said first and second inlet passageways to said first and second annular chambers respectively;

third and fourth openings (112,114) in said hollow valve cylinder for passing fluid from said first and second annular chambers respectively to said mixed fluid chamber;

first and second mutually telescoping means attached to said valve body and said main valve assembly respectively for preventing rotation of said main valve assembly relative to said valve casing while the latter undergoes axial movement relative to said valve casing; and a spindle (90) having a peripheral flange (94) and a threaded axial bore (108,109);

means (100,102,104,70) rotatably coupling said spindle to said valve body;

means including a bushing (70) and a collar (104) for preventing axial movement of said spindle as it is rotated, said bushing being screwed into said valve body in surrounding relation with a portion of said spindle and said collar being screwed onto said bushing and arranged to captivate said peripheral flange so as to prevent axial movement of said spindle relative to said body while permitting rotational movement of said spindle relative to said body;

means (96,51) coupling said spindle to said main valve assembly so that rotation of said spindle will cause axial movement of said tubular section within said valve casing and movement of said first and second valve means between a first closed position and a second open position relative to said first and second valve seats respectively; and a limit pin (113) screwed into said axial bore, said limit pin having a length sufficient for it to project from said spindle far enough to intercept and thereby limit the range of axial movement of said main valve assembly relative to said valve body.

3. A mixing valve according to claim 2 in which said last-mentioned means comprises:

screw means connecting said spindle to said main valve assembly whereby rotation of said spindle will cause axial movement of said main valve assembly.

4. A mixing valve according to claim 2 wherein said telescoping means comprises means defining a cavity (76) fixed with respect to said valve body, and a pin (47) carried by said main valve assembly and extending slidably into said cavity.

5. A mixing valve according to claim 2 wherein said chamber-forming means comprises a pressure-equalizing piston valve (120) movably disposed within said valve cylinder and arranged so that changes in the fluid pressure of either or both of said first and second fluids will cause said piston valve to move longitudinally in a direction and by an amount substantially sufficient to regulate the relative flow of said fluids into said mixed water chamber via said annular chambers so as to maintain substantially constant the temperature of the fluid in said mixed water chamber.

6. A mixing valve according to claim 2 wherein said main valve assembly has a threaded central bore, and said spindle has a threaded section that is screwed into said threaded central bore, whereby rotation of said spindle will cause said main valve assembly to move axially relative to said main valve chamber.

* * * * *